June 23, 1936.  O. G. BENNETT  2,045,379
APPARATUS FOR DIFFUSING GASES
Filed Sept. 23, 1932
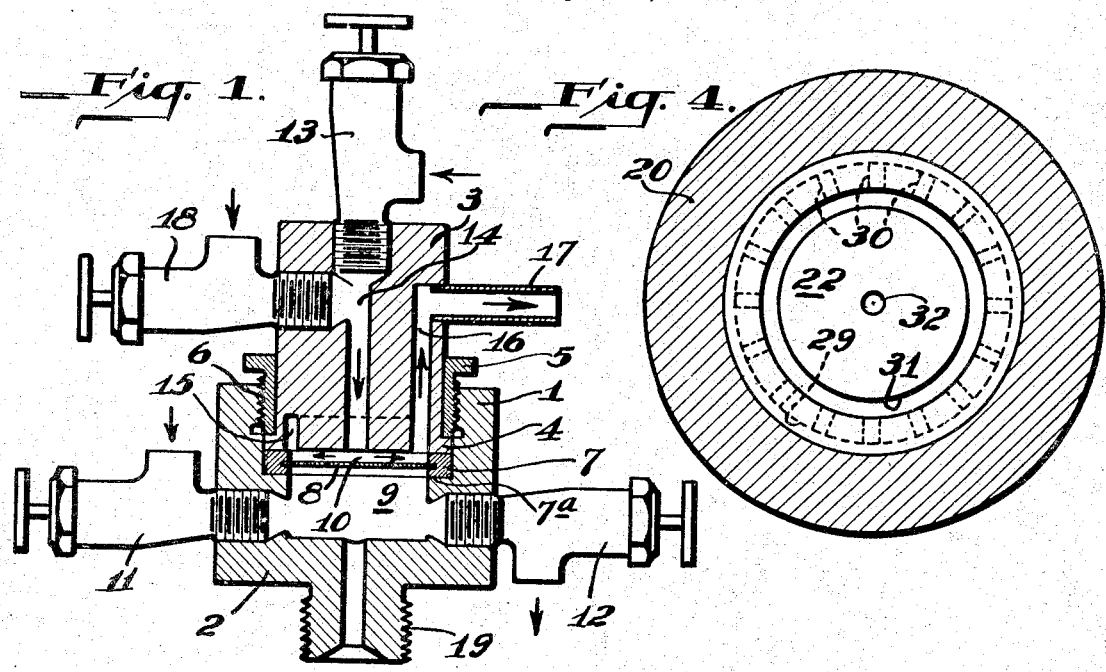
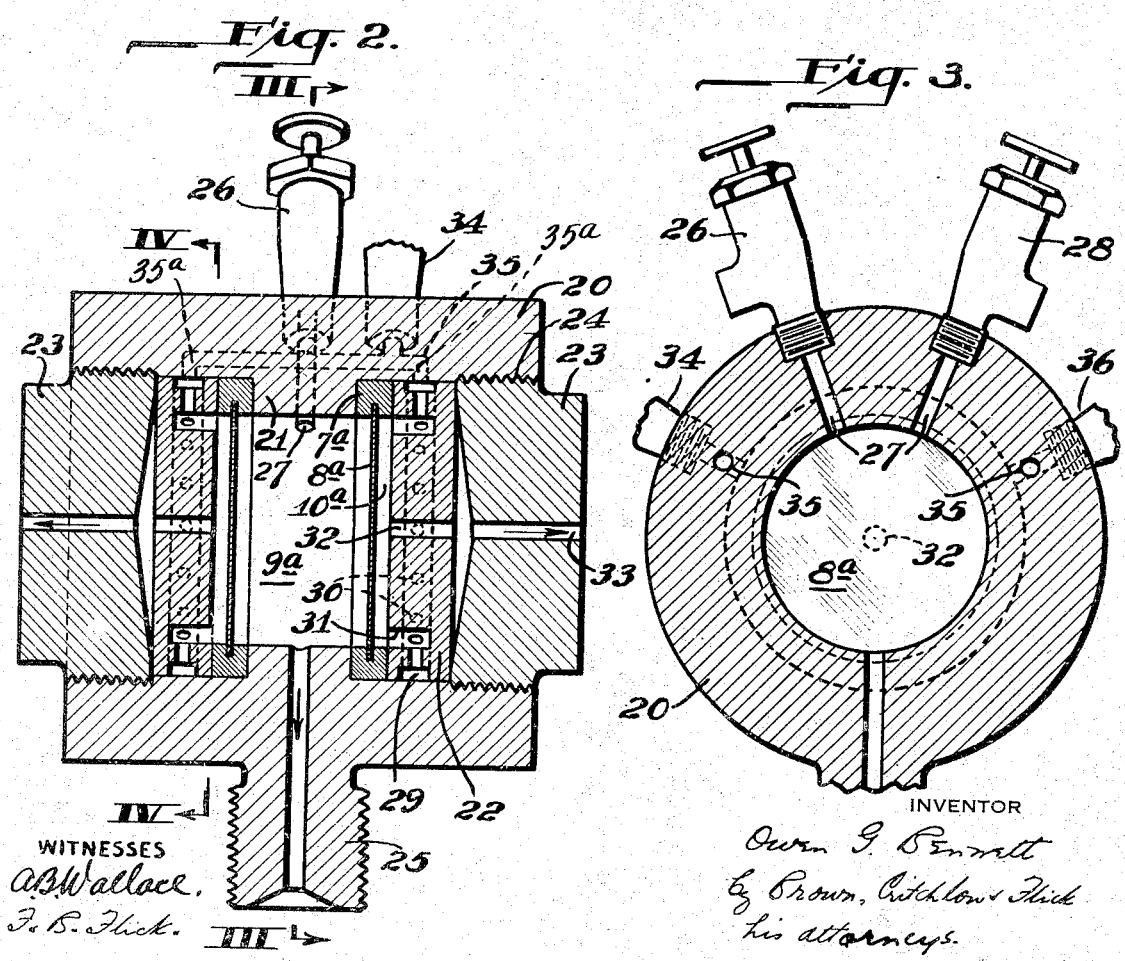
INVENTOR
Owen G. Bennett
By Brown, Critchlow & Flick
his attorneys.

Patented June 23, 1936

2,045,379

UNITED STATES PATENT OFFICE 2,045,379

APPARATUS FOR DIFFUSING GASES

Owen G. Bennett, Baltimore, Md., assignor to Catalyst Research Corporation, Baltimore, Md., a corporation of Maryland Application September 23, 1932, Serial No. 634,572

2 Claims. (Cl. 73—51)

This invention relates to diffusion of gases, and it is among its objects to provide a simple and effective apparatus for diffusion of gases, for rapid, accurate and ready determination of various information pertaining to such gases, such as the composition of gaseous mixtures, fractionation of gaseous mixtures to separate one or more constituents, or determination of the relative density of a gas. A special object is to provide a diaphragm for use in diffusion apparatus, which is strong and especially suited for such purposes.

In accordance with known physical laws the velocity at which a gas diffuses through a porous, or permeable, diaphragm is inversely proportional to the square root of the density of the gas. Accordingly, if two gases of different density are brought into contact with opposite sides of a porous diaphragm they will diffuse through it at different rates, and the ratio of their rates of diffusion will be determined by the square root of the inverse ratio of their relative densities. If the rates of diffusion could be measured this would provide a means of determining the density of a gas, by ascertaining its rate of diffusion in comparison to that of a gas of known density. Thus the known gas may be enclosed in a space sealed by a suitable diaphragm and provided with means for measuring pressure and the unknown gas passed over the other side of the diaphragm. If there is a difference in density between the two gases there will be a difference in the rate of diffusion through the diaphragm, which will manifest itself by a change in pressure within the space enclosing the known gas. For example, if air is enclosed in a chamber having a porous diaphragm constituting one wall, and hydrogen is passed over the outer surface of the diaphragm, the hydrogen will diffuse through the diaphragm at a greater rate than the air will diffuse outwardly, and the pressure within the cell will increase. This pressure change may be used to calculate the density of the unknown gas.

This principle and action may be applied also to other ends. For instance, the various constituents of a gaseous mixture will find their way through the pores of the diaphragm independently of the others, which renders it applicable to analysis of gaseous mixtures, and to separation of constituents from a gaseous mixture.

Certain essential features must be embodied in the practical and satisfactory application of these principles. For instance, the device must give a large pressure difference for small differences in density of the gases used, it must be quick acting, of simple construction, easy to use, and must be capable of repetition of results upon repeated use with the same materials. Moreover, the diaphragms must be sturdy, readily prepared, of uniform porosity, and adapted to provide suitable diffusion characteristics. As far as I am aware these and other desiderata have not been embodied in the means previously available for this purpose, being either delicate, tedious and slow in use, or requiring skilled attention, or having unsatisfactory diaphragms.

The invention may be described in connection with the accompanying drawing, in which Fig. 1 is a central sectional view through one apparatus embodying the invention; Fig. 2 a view similar to Fig. 1 through a modified form of apparatus; and Figs. 3 and 4 sectional views taken on lines III—III and IV—IV, respectively, Fig. 2.

The invention is predicated in part upon my discovery that for satisfactory compliance with the requirements of such an apparatus it is necessary to pass the unknown gas, i. e. the gas under investigation, over the surface of the permeable diaphragm at a rate sufficiently high that the composition of the unknown gas will not be materially changed by the diffusion process, i. e. either by diffusion from that gas into the known gas, or by diffusion of the known gas outwardly into the unknown gas. The invention is predicated further on my discovery that it is necessary in a satisfactory and practicable apparatus that the volume of the known, or standard, gas be small compared with the area of the diaphragm, i. e. the ratio of the diaphragm area to the volume of standard gas must be large. I have discovered also, and this is a particularly important feature of the invention, that especially desirable results attend the use of diaphragms compressed from metallic nickel prepared in a state of exceedingly fine subdivision by amalgamation of nickel with mercury and vacuum distillation of the mercury from the amalgam, as will be described more fully hereinafter.

The invention may be described more in detail in connection with the accompanying drawing. Having reference to Fig. 1, the apparatus shown comprises a hollow casing 1 defining an internal chamber closed at one end, e. g. by a base portion 2 integral therewith. The upper end of the casing is closed by a removable head, that shown comprising a plug member 3 provided at its lower end with an outwardly projecting flange 4 which is engaged by a compression sleeve 5 threaded exteriorly to engage cooperating threads 6 formed in the opening in casing 1. Flange 4 is pressed by compression sleeve 5 against a ring member 7 seated on an internal flange 1a. This ring carries a diaphragm 8, permeable by gas, which divides the chamber within the casing into two separated spaces 9 and 10. The diaphragm ring 7 should make a gas tight fit with flange 1a and plug 3, and gaskets may be used if need be.

Space 9 acts as an enclosing chamber for confining the gas used as a standard in the practice of the invention. This gas may be introduced into the chamber by any suitable means, for example through a valve 11 which opens into space 9, a similar valve 12 being provided for sweeping out the space before and after the apparatus is used. The gas to be investigated, i. e. the unknown gas, is flowed through space 10 in contact with the outer side of diaphragm 8. In the embodiment shown the unknown gas is introduced through a valve 13 in plug 3 which opens into a duct 14 bored longitudinally through the plug. The gas flows into space 10 over the upper surface of diaphragm 8 in intimate contact therewith, and then passes into an annular channel 15 in the bottom of the plug, and escapes thence through a duct 16 to an outflow tube 17. The plug may also be provided with a valve 18 opening into duct 14, for a purpose presently to be described. A pressure-measuring means, not shown, is connected to space 9, as by a nipple 19. Such pressure-indicating means are well known in the art.

An important feature of this invention resides in causing the unknown gas to move at a relatively high velocity over the surface of the diaphragm. This may be accomplished, as shown in Fig. 1, by making space 10 relatively narrow, i. e. so that the conduit which is formed between the diaphragm and the closure plug is narrow. This causes the gas to move over the diaphragm at high velocity. My work has shown that this is necessary to obtain accurate results in the use of the apparatus, provided by this invention, it being necessary to move the unknown gas over the diaphragm at a rate such that diffusion from or into the unknown gas does not materially alter its composition. By moving the unknown gas at relatively high velocity such diffusion as takes place is negligible as regards composition change, and can be considered constant.

I have discovered further that in order rapidly to attain equilibrium conditions it is necessary also to proportion the volume of known gas with respect to the area of the diaphragm. For example, using the same diaphragm and the same gases, the rate of diffusion will be the same irrespective of the volume of the enclosed standard gas. However, the maximum pressure change due to the diffusion will be attained more slowly the greater the volume of the standard gas. In accordance with this invention, the volume of standard gas is made small compared with the area of the diaphragm, whereby rapidly to obtain the maximum pressure change due to the diffusion. For the attainment of the most accurate results, however, the ratio of volume of known gas to the diaphragm area cannot be increased indefinitely, because with the pressure-indicating means now available a change in volume due to the actuation of the gauge or manometer or other means occurs as the gas pressure changes. Thus as the pressure within the space is increased, the resultant actuation of the indicating device will increase the volume of the space. If the volume of gas is very small, such volume changes due to the indicating means will represent a substantial proportion of the initial gas volume, and will therefore cause erroneous results. Thus although for the reason previously stated the ratio of the diaphragm area to the volume of the gas enclosing space should be large, due regard should be given to the ratio of that volume to. the change in volume caused by actuation of the gauge or the like, to minimize error. This latter factor will vary according to the particular type of means used, but its effect will be readily obtainable for each such means and proposed size of known gas enclosing space.

In accordance with the principles just stated, I have found that for many purposes the gas enclosing space should not be smaller than that which would be changed more than 20 per cent by actuation of the pressure measuring device, and it should not exceed four units of volume per unit of diaphragm area.

As an illustration of the application of these factors, satisfactory results were obtained with an apparatus such as shown in Fig. 1 having a diaphragm 1-inch in diameter disposed approximately one-half inch from the bottom 2 of the casing. This diaphragm positioning formed a space 9, for known gas, of approximately 0.36 cubic inch volume. The bottom of plug 3 was disposed approximately $\frac{1}{16}$ inch above the diaphragm. With this apparatus, and using a rate of flow of unknown gas of about one liter per minute satisfactory readings were obtained using a Bourdon-type pressure gage, equilibrium being reached in about 35 to 40 seconds.

In the use of this apparatus for determination of the density of a gas, valves 11 and 12 are opened, and space 9 is swept out with the known, or standard, gas, supplied, for example, through valve 11. Dry air is the most economical and desirable gas for this purpose, particularly since gas densities are generally calculated with respect to air. At the same time space 10 is swept out with the standard gas supplied through valve 18. Valve 13, connected to a source of the gas to be tested (unknown gas), is closed during this operation. When the two spaces have been thoroughly swept out valves 11 and 12 are closed, thus confining a volume of air in space 9, e. g. under atmospheric pressure, valve 18 is closed, and unknown gas is flowed over the diaphragm by opening valve 13. In order to obtain concordant and comparable results it is essential that the initial pressure of the two gases on opposite sides of the diaphragm be equal. If there is a difference in densities of the two gases, the pressure in space 9 will increase or decrease, depending upon whether diffusion takes place more rapidly into or from the known gas. The pressure developed at equilibrium can be used to calculate the density of the unknown gas.

Although in the apparatus shown in Fig. 1 space 9, which encloses the standard gas, cannot be reduced in volume indefinitely for the reason explained hereinabove, the rate at which equilibrium is obtained may be increased, without decreasing the accuracy of the result, by increasing the exposed diaphragm area. This does not introduce the source of error referred to previously. This may be done most suitably by the use of a plurality of diaphragms, for instance, a pair of diaphragms constituting opposite walls of the standard gas enclosing space. Such an apparatus is shown in Figs. 2 to 4. This embodiment comprises a tubular casing 20 provided centrally with an interiorly projecting collar 21, and against each side of the collar there is pressed a ring 7a carrying a diaphragm 8a, as in the preceding embodiment. These rings are pressed firmly through disc members 22 by means of compression plugs 23 threadably engaging at 24 in the ends of the casing. The space between the discs 8a thus forms a standard gas enclosing space 9a, Fig. 2. As in the apparatus of Fig. 1, rings 7a should seat tightly; preferably they are accurately ground to collar 21 and discs 22 to this end. Space 9a is connected by a nipple 25 to a suitable pressure indicating device, not shown. Standard gas is introduced into space 9a through a valve 26 and a bore 27 extending through the casing into space 9a. A valve 28 similarly connected to space 9a provides for sweeping out the chamber with standard gas, as described hereinabove.

By reason of the fact that the diaphragm is offset in ring 7a from its surfaces it forms with disc 22, a conduit 10a, Fig. 2, for passage of unknown gas over the exterior of the diaphragm. This construction gives the restricted passage needed to cause the gas to move at high velocity. The unknown gas may be flowed through this conduit in various ways. One advantageous construction is that shown in Figs. 2 to 4. A groove 29 disposed peripherally in the edge of disc 22 is connected by a series of radial bores 30 to an annular internal groove 31 facing toward the exterior of disc 8a. Disposed centrally of the disc is a transverse bore 32 aligned with a similar bore 33 formed in plug 23, forming means for outflow of gas from space 10a. Unknown gas is led to discs 22 through a valve 34 to a bore 35 formed longitudinally in the casing. This bore has side branches 35a which are positioned to align exactly with groove 29 of disc 22. The unknown gas thus flows through valve 34, duct 35, into groove 29, and thence through bores 30 into groove 31, from whence it flows over the outer surface of disc 8a, and escapes through bores 32 and 33. A valve 36 arranged similarly to valve 34 may be provided for introducing standard gas, e. g., air, to sweep out unknown gas remaining in the apparatus, as in the case of Fig. 1.

No detailed description of the use of this apparatus need be given, its use being wholly similar to that of Fig. 1. However, as illustrating the benefits in speed of operation, as compared with Fig. 1, it may be noted that using air as the standard gas, and hydrogen as the unknown gas (1 liter per minute), and using the diaphragm presently to be described, an equilibrium pressure of 150 inches of water was developed in 15 seconds. With a diaphragm of the same size and material, and the same volume of air, with other operating conditions identical, the apparatus shown in Fig. 1, required about 37 seconds to develop the same pressure.

A particular feature of the invention resides in the use of diaphragms of a novel character. I have found that especially beneficial results are obtained by the use of diaphragms made by compressing metallic nickel in a state of exceedingly fine subdivision. The most suitable metallic nickel for this purpose is prepared by a special procedure, according to which there is formed a nickel amalgam, and the mercury is distilled therefrom under high vacuum and in the absence of gases which react with the nickel. The nickel remains as an impalpable powder of exceptionally fine particle size. The unique character of the nickel powder thus produced is evidenced by the fact that it unites under pressure, without the use of heat or binders, to form coherent bodies having the appearance of massive nickel.

This material may be compressed to form a strong and coherent body suitable for use in the practice of the invention. For example, diaphragms suitable for use in the practice of the invention have been made by pressing 2.75 grams of such powdered nickel to form a disc approximately 1-inch in diameter, using a pressure of two thousand pounds per square inch. I have found that such discs are particularly adapted for use in the practice of the invention because their pores are so fine that gases pass through them only by true diffusion, because they are strong, give rapid readings, and because among other things, substantial pressures can be built up with them.

The invention is applicable to purposes other than density determinations, as will be understood by those skilled in the art. Thus, the rapidity of equilibrium attainment renders it useful for analytical purposes, and for separation of gaseous mixtures. The sturdiness, rapidity of action, and substantial pressures which can be built up are advantageous for the foregoing purposes, as well as making other applications feasible, including its use as a detector element in alarm apparatus for use in signalling abnormal conditions in gas atmosperes, such as the signalling of the presence of dangerous amounts of explosive gases in mine atmospheres, and other similar applications.

Since the density of a gas or the presence of a particular constituent in a gaseous mixture determines the characteristics of those materials, the term "quantitatively determining a characteristic of a gas" is used in the claims to concisely include reference to the treatment of a gas for analyzing it with reference to one or more constituents, or to determine its density.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An apparatus for diffusion of gases comprising a hollow casing closed at its ends, a pair of permeable diaphragms mounted in spaced relation in said casing and forming therebetween a gas-enclosing space, means for introducing and confining a gas in said space, means forming with the exterior of each of said diaphragms a separate gas conduit of width restricted to cause gas passed therethrough to move at high velocity over the surface of the diaphragm exteriorly of said chamber, means for supplying gas to said conduits, and pressure-responsive means associated with said gas-enclosing space to indicate the pressure of gas confined therein.

2. As a new article of manufacture, a gas diffusion diaphragm composed of finely divided nickel compressed into a strong and coherent body, the nickel having been formed by evaporation of mercury from a mercury-nickel amalgam to leave the nickel in a state of exceedingly fine sub-division.

OWEN G. BENNETT.